(No Model.)
J. F. STEWARD.
METHOD OF AND MACHINERY FOR MAKING TWINE.
No. 501,971. Patented July 25, 1893.
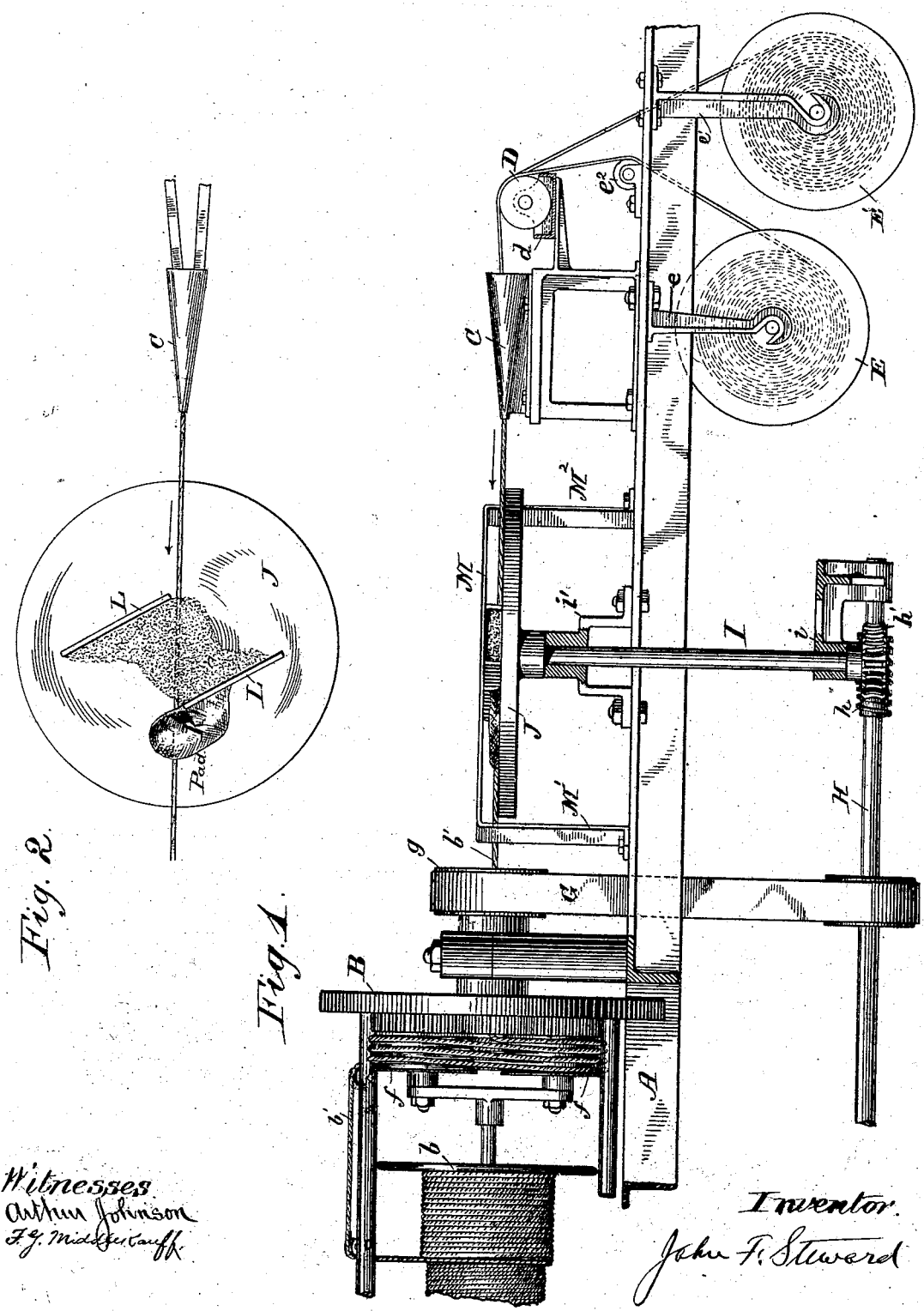

UNITED STATES PATENT OFFICE.

JOHN F. STEWARD, OF CHICAGO, ILLINOIS.

METHOD OF AND MACHINERY FOR MAKING TWINE.

SPECIFICATION forming part of Letters Patent No. 501,971, dated July 25, 1893.

Application filed November 25, 1892. Serial No. 453,148. (No model.)

*To all whom it may concern:*

Be it known that I, JOHN F. STEWARD, of Chicago, in the county of Cook and State of Illinois, have invented a new twine for use in binding grain with automatic binders, a method of producing the same, and a machine for manufacturing the twine, of which the following is a specification.

The twine as an article of manufacture forms the subject of a separate application of even date herewith designated by the Serial No. 453,147.

My twine consists of strips of paper coiled, twisted and coated with a dry lubricant, preferably plumbago.

By the term "dry lubricants" I mean such as, in their normal state, are sufficiently free from oils, fats, gums, resins, hydrogen, &c., to permit comminution or reduction to a pulverized condition, and such as, when used and applied in a moistened condition, will give up their moisture by natural evaporation and return again to a dry condition.

Attempts have been made to bind grain with paper twine, but the friction and consequent adhesion of such twine to the knot tying device, particularly that of the kind over the end of which the knot is drawn to be completed, have been so great that the strength of the twine has not proven sufficient to stand the stress of such withdrawal. Another difficulty has been due to the stiffness of paper twine, and also the friction between the surface of those parts of the twine that rub together when the knot was being drawn tightly, the result having been that the parts of the twine adapted to encircle the bow of the knot could not be drawn tight enough to hold the said bow from becoming free. In short, twine of paper has not been strong enough and pliable enough to admit of the formation of a perfect knot by some of the automatic means. Oils have been used to soften the twine and to so lubricate the surfaces as to sometimes make it possible for a weak twine to be drawn into a tight knot, but oil lubrication has been found injurious because of its penetration of the paper, and besides, after remaining for some time in the ball making the twine brittle, or injuring the paper when freshly applied, by making it too soft, and injuring the strength generally.

In some classes of grain binders one end of the twine is held under considerable pressure and permitted to render to the knot tyer, as required by the latter, only by slipping through the elastically acting holding jaws. As the space between the two jaws is necessarily so small that the twine is flattened between them, it becomes necessary to adapt the latter to be drawn through the narrow space, to do which, that portion which extends beyond the jaws must be competent to stand the flattening necessary to permit it to pass into and through the narrow space. I have discovered that a paper twine, if given only surface lubrication,—that is, by means of a lubricant that will not penetrate the paper, will pass the knotting mechanism with less friction than other twines lubricated as heretofore. The twine for the purpose is a small coiled paper tube collapsed by twisting, over the surface of which is spread a coating of plumbago. The method of making the same is as follows: Paper is cut into strips and drawn through a funnel which has the effect of forming it into a tube, the aperture of the funnel being small so as to condense the tube as much as possible. The tube thus formed is passed to a flier which may be of any of the well known forms, and twisted by the rotation of the latter and wound onto a spool or other suitable receptacle for it. After the paper is twisted, the dry lubricant, preferably plumbago, is applied. It is better to dampen the paper slightly in order that it may twist freely, and I take advantage of the dampness of the newly spun twine to make the plumbago, or other lubricant, adhere to its surface. I find, however, that the plumbago may be applied after the paper is dry, but that more rubbing is necessary to make it adhere than when the latter is slightly damp.

In the drawings Figure 1 is a side elevation of the flier of an ordinary spinner, and of the coating attachment. Fig. 2 is a detail of the coating device.

A is the frame-work of the machine.

B is any kind of a flier that is adapted to draw the twine and twist it. It is of the form usually used in spinning the coarser fibers, such as manila and sisal.

$b$ is the spool upon which the twine $b'$ is shown as wound. Mounted upon the frame-work A is the funnel C. Adjacent thereto is the wetting roller D. This is journaled in the sides of a trough $d$, in which water is placed.

E and E' are coils of paper that have been cut into narrow strips supported on short shafts, journaled in hangers $e$ and $e'$ beneath the main frame A.

$e^2$ is a roller journaled in a bearing on the frame, that is adapted to guide the strips of paper on their way to the spinner. The latter may be given rotation by any of the usual means, and the feeding action of the grooved drums $f$ may be produced and regulated by the belt G running over the pulley $g$.

The operation of the machine, as far as described, is as follows: The paper coils being placed in the positions shown in Fig. 1, the strips of paper are carried upward and pass over the roller D, which, by revolution, becomes wetted and the paper in turn dampened. By the action of the flier the twine is drawn in the direction indicated by the arrow and the tube is thus twisted between the flier and the point of the delivery opening of the funnel. The twine, between the point of its entrance into the flier and its exit from the funnel is, of course, in constant rotation and I take advantage of this fact by placing the coating device adjacent thereto so that the rotation of the strand will have the effect of rubbing the substance well thereagainst. To carry this method into effect I mount a worm $h$, on the shaft H, and mesh thereinto the worm wheel $h'$, secured to the shaft I. The latter is supported in bearings $i$, and $i'$. Upon the upper end of the shaft I, is secured the disk J, which, by means of the said worm wheel is given slow rotation. It is so located, as stated, that the twine will rotate against its surface, and upon the disk is placed a small heap of dry lubricant, either in the form of powder, or softened by moisture into a creamy mass. To prevent the moving twine from carrying the lubricant with it off from the rotating plate, I apply the pad K which may be a wad of cloth, cotton waste, or any material that will act as a brush. The tendency of the twine to carry the powder off the plate is not great, but in order to counteract any tendency so to do, and bring the substance back to the center of the disk, I apply the scrapers L which are secured to the cross bar M upon the standards M' and M². I make the disk J quite large so that the twine, after the powder has adhered to it, may rotate in contact therewith for a little length of time so as to brush it more firmly onto the surface.

While it is preferable to form the strips of paper into tubes and then collapse by twisting them, I do not confine myself to that method, as a result but little inferior may be reached by crimping the strips of paper and then twisting them into twine, and I wish my broader claims to be construed to cover a twine formed of paper twisted and its surface covered with any dry lubricant. I find it possible to draw the strips of paper from sliver cans, but prefer taking them from rolls, as shown.

What I claim as my invention, and desire to secure by Letters Patent, is—

1. The process of making paper twine consisting in crushing or collapsing a strip of paper, then twisting the same and applying a dry lubricant during the twisting operation.

2. The process of making paper twine consisting in dampening a strip of paper, crushing or collapsing the same, then twisting and applying a lubricant during the twisting operation.

3. The process of forming twine, consisting in crushing or collapsing a strip of damp paper, twisting the same after it is crushed and rubbing onto the surface of the said dampened twine a coating of dry lubricant, substantially as described.

4. In a machine for the manufacture of paper twine, the combination with the tubular former C and the flier B, of a rotary, lubricant-holder for coating the surface of the twine with a dry lubricant, substantially as described.

5. The combination of the tubular former, the flier, and the brushing wheel J, rotatable on a vertical axis between the former and the flier substantially as described.

6. In combination with the tubular former and the flier, the brushing wheel rotatable on a vertical axis between the former and the flier and the wiping pad K, supported in proximity to the face of the table in the path of the twine substantially as described.

JOHN F. STEWARD.

Witnesses:
ARTHUR JOHNSON,
F. G. MIDDLEKAUFF.